(12) United States Patent
Fujitani

(10) Patent No.: US 7,591,344 B2
(45) Date of Patent: Sep. 22, 2009

(54) PERIPHERAL COMPONENT FOR AUDIO EQUIPMENT

(75) Inventor: Takeshi Fujitani, Neyagawa (JP)

(73) Assignee: Onkyo Corporation, Osaka (JP)

( * ) Notice: Subject to any disclaimer, the term of this patent is extended or adjusted under 35 U.S.C. 154(b) by 212 days.

(21) Appl. No.: 11/376,903

(22) Filed: Mar. 16, 2006

(65) Prior Publication Data

US 2007/0072997 A1    Mar. 29, 2007

(30) Foreign Application Priority Data

Sep. 26, 2005    (JP)    .............................. 2005-277389

(51) Int. Cl.
*G10K 13/00* (2006.01)
*H04R 7/00* (2006.01)
*C08L 71/12* (2006.01)
*C08F 8/00* (2006.01)

(52) U.S. Cl. ................. 181/171; 181/167; 181/157; 525/132; 525/191

(58) Field of Classification Search ................. 181/169, 181/171, 157, 167; 525/132, 191, 92, 905
See application file for complete search history.

(56) References Cited

U.S. PATENT DOCUMENTS

| | | | | |
|---|---|---|---|---|
| 3,306,875 | A | * | 2/1967 | Hay ............................ 528/215 |
| 4,892,904 | A | * | 1/1990 | Ting ............................ 524/494 |
| 4,917,882 | A | * | 4/1990 | Strobridge .................... 424/59 |
| 2004/0112672 | A1 | * | 6/2004 | Ono et al. ................... 181/169 |
| 2004/0152820 | A1 | * | 8/2004 | Atkinson ..................... 524/445 |

FOREIGN PATENT DOCUMENTS

| | | | |
|---|---|---|---|
| EP | 0577123 A1 | | 1/1994 |
| JP | 5112726 A | | 5/1993 |
| JP | 05255537 A | | 10/1993 |
| JP | 6015673 A | | 1/1994 |
| JP | 08-140182 A | | 5/1996 |
| JP | 8170014 A | | 7/1996 |
| JP | 9084168 A | | 3/1997 |
| JP | 9093692 A | | 4/1997 |
| JP | 09-302222 A | | 11/1997 |
| JP | 09295308 A | * | 11/1997 |
| JP | 2000154322 A | | 6/2000 |
| JP | 2000175289 A | * | 6/2000 |
| JP | 2002315092 A | * | 10/2002 |
| JP | 2003268246 A | | 9/2003 |

OTHER PUBLICATIONS

Cameo Chemicals Data Sheet regarding Foster Grant 834 polystyrene (www.cameochemicals.noaa.gov/report/?chem_id=12432).*
Machine translation of JP 09-295308 (2008).*

* cited by examiner

*Primary Examiner*—Mark Eashoo
*Assistant Examiner*—Liam J Heincer
(74) *Attorney, Agent, or Firm*—The Webb Law Firm

(57) ABSTRACT

There is provided: a lightweight peripheral component for audio equipment having a good balance between a large internal loss and excellent mechanical properties, and having excellent thermal resistance, dimensional stability, and an excellent S/N ratio; and a speaker using the same. The peripheral component for audio equipment of the present invention contains a polyphenylene ether-based resin (A), a polystyrene-based resin (B), and a polyolefin-based resin (C).

8 Claims, 6 Drawing Sheets

PERIPHERAL COMPONENT FOR AUDIO EQUIPMENT

BACKGROUND OF THE INVENTION

1. Field of the Invention

The present invention relates to a peripheral component for audio equipment, and to a speaker using the same. The present invention more specifically relates to a lightweight peripheral component for audio equipment having a good balance between a large internal loss and excellent mechanical properties, and having excellent thermal resistance and an excellent S/N ratio, and to a speaker using the same.

2. Description of the Related Art

In a case where a tweeter unit is installed in a speaker box of an audio system in which speaker units are each independently held in a speaker box, the tweeter unit may be installed in a box through a horn-shaped peripheral component. A particle board or a synthetic resin such as an ABS resin or a propylene resin is used as a material for the peripheral component. The particle board contains a thermosetting resin having a relatively high hardness such as an epoxy resin or a phenol resin for preventing deformation or strength reduction due to moisture absorption. Thus, an internal loss decreases, and vibration from a tweeter is often transmitted as it is and emitted as unnecessary noise. The synthetic resin such as an ABS resin or a polypropylene resin provides a moderate internal loss and excellent vibration control property, but often has insufficient thermal resistance or strength. In order to improve thermal resistance and strength, an inorganic-based filler such as glass fiber, titanium oxide, talc, or mica is added. However, the addition leads to weight increase and reduction of internal loss, and often results in emission of unnecessary noise.

In order to solve the above-mentioned problems, there has been proposed a speaker frame prepared by alloying a polyphenylene ether resin and a polyamide resin and adding mica to the alloy (see JP 3409579 B, for example). The polyphenylene ether resin and the polyamide resin have poor compatibility with each other and require use of a compatibilizing agent in combination. However, increase in use amount of the compatibilizing agent causes significant strength reduction due to reduction in thermal stability, decomposition, or the like. Further, alloyed polyphenylene ether resin and polyamide resin may have poor fluidity and insufficient forming property.

There has been proposed addition of a rubber-like substance or an inorganic filler to an amorphous mixture of a polyphenylene ether resin and a styrene resin, or to an alloy of a graft polymer of a polyphenylene ether resin and a styrene resin, and a polyamide resin (see JP 3317052 B, for example). Addition of a rubber-like substance improves the internal loss but causes a problem of reducing strength, and addition of an inorganic filler improves the strength but causes problems of increasing weight, reducing internal loss, and degrading an S/N ratio.

SUMMARY OF THE INVENTION

The present invention has been made in view of solving the conventional problems as described above, and an object of the present invention is therefore to provide: a lightweight peripheral component for audio equipment having a good balance between a large internal loss and excellent mechanical properties, and having excellent thermal resistance and an excellent S/N ratio; and a speaker using the same.

A peripheral component for audio equipment according to an embodiment of the present invention includes: a polyphenylene ether-based resin (A); a polystyrene-based resin (B); and a polyolefin-based resin (C).

In one embodiment of the invention, a weight ratio of the polyphenylene ether-based resin (A) to the polystyrene-based resin (B) (A)/(B) is 90/10 to 70/30.

In another embodiment of the invention, the polyolefin-based resin (C) is included in an amount of 5 to 20 parts by weight with respect to 100 parts by weight in total of the polyphenylene ether-based resin (A) and the polystyrene-based resin (B).

In still another embodiment of the invention, the polyphenylene ether-based resin (A) and the polystyrene-based resin (B) are alloyed.

In still another embodiment of the invention, the polyphenylene ether-based resin has a number average molecular weight of 5,000 to 1,000,000.

In still another embodiment of the invention, the polystyrene-based resin has a number average molecular weight of 400 to 500,000.

In still another embodiment of the invention, the polyolefin-based resin includes at least one selected from the group consisting of polyethylene, polypropylene, and an ethylene/propylene copolymer.

In still another embodiment of the invention, the polyolefin-based resin has a number average molecular weight of 500 to 100,000.

In one embodiment of the invention, the peripheral component for audio equipment is used for at least one member selected from the group consisting of a horn, a field cover, an equalizer, a flame, and an equalizer support.

According to another aspect of the invention, a speaker is provided. The speaker includes the above-described peripheral component for audio equipment.

As described above, according to the present invention, the peripheral component for audio equipment contains a polyphenylene ether-based resin, a polystyrene-based resin, and a polyolefin-based resin, to thereby provide a lightweight peripheral component for audio equipment having a good balance between a large internal loss and excellent mechanical properties, and having excellent thermal resistance and an excellent S/N ratio. To be specific, the peripheral component for audio equipment contains a polyphenylene ether-based resin, a polystyrene-based resin, and a polyolefin-based resin in a specific ratio, to thereby provide a peripheral component for audio equipment having a good balance between a remarkably large internal loss and excellent mechanical properties without degrading the excellent thermal resistance, moisture resistance, forming property, dimensional stability, and lightweight property inherent in those resins.

Further, according to the present invention, a resin composition used for forming the peripheral component for audio equipment may have excellent fluidity without use of a compatibilizing agent, to thereby provide a peripheral component for audio equipment having excellent forming property. The resin composition requires no use of a compatibilizing agent, and thus significant strength reduction due to reduction in thermal stability, decomposition, or the like may be prevented. As a result, the peripheral component for audio equipment of the present invention may suitably be used for a member having a complex shape such as a horn or an equalizer and requiring a good balance between a large internal loss and strength.

DESCRIPTION OF THE PREFERRED EMBODIMENTS

Figure 1:
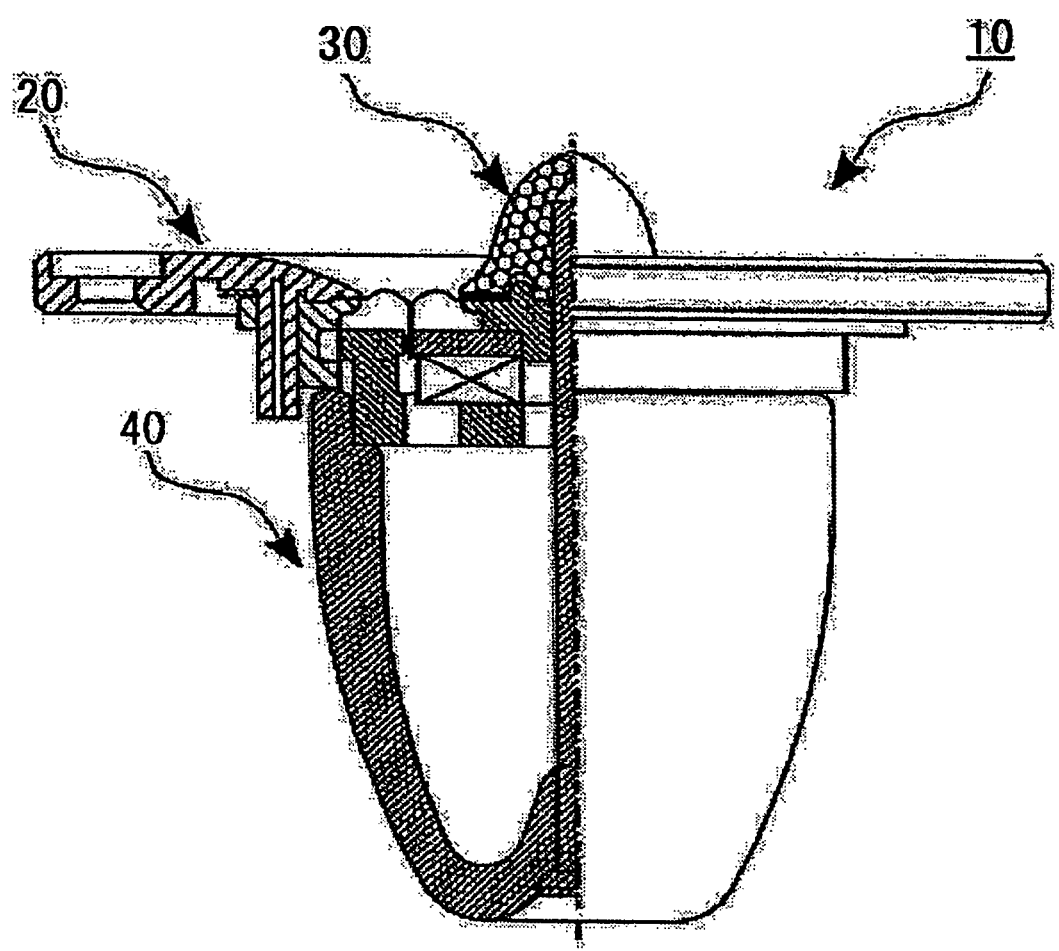
FIG. 1 is a schematic sectional view explaining a structure of a speaker in which the peripheral component for audio equipment according to a preferred embodiment of the present invention is used.

A peripheral component for audio equipment of the present invention includes a resin composition containing a polyphenylene ether-based resin (A); a polystyrene-based resin (B); and a polyolefin-based resin (C). The peripheral component for audio equipment includes those resins, to thereby provide a lightweight peripheral component for audio equipment having a good balance between a large internal loss and excellent mechanical properties, and having excellent thermal resistance and an excellent S/N ratio. The resin composition requires no use of a compatibilizing agent, and thus significant strength reduction due to reduction in thermal stability, decomposition, or the like may be prevented.

A weight ratio of the polyphenylene ether-based resin (A) and the polystyrene-based resin (B) may appropriately be set in accordance with the purpose. The weight ratio (A) (B) is preferably 90/10 to 70/30, more preferably 85/15 to 75/25, and most preferably about 80/20. Too large a ratio of the polyphenylene ether-based resin may provide a resin composition with insufficient fluidity and may cause formation defects. Too small a ratio of the polyphenylene ether-based resin may provide a peripheral component for audio equipment having insufficient thermal resistance. Use of the polyphenylene ether-based resin and the polystyrene-based resin at such a specific ratio may provide a peripheral component for audio equipment having excellent forming property, thermal resistance, moisture resistance, mechanical properties, and dimensional stability.

A content of the polyolefin-based resin (C) may appropriately be set in accordance with the purpose. The content of the polyolefin-based resin (C) is preferably 5 to 20 parts by weight, and more preferably 8 to 20 parts by weight with respect to 100 parts by weight in total of the polyphenylene ether-based resin (A) and the polystyrene-based resin (B). Use of the polyolefin-based resin (C) within the above ranges may provide a lightweight peripheral component for audio equipment having excellent forming property.

The polyphenylene ether-based resin (A) and the polystyrene-based resin (B) exist together in any appropriate state. Specific examples thereof include a mixed state and an alloyed state. In the specification of the present invention, the term "mixing" refers to mixing two or more types of resins uniformly in a macroscopic scale, and the term "alloying" refers to dispersing two or more types of resins uniformly in a microscopic scale. Alloying includes copolymerization (such as block copolymerization or graft copolymerization). Preferably, the polyphenylene ether-based resin (A) and the polystyrene-based resin (B) are alloyed. Alloying may provide mechanical properties, chemical properties, and the like which cannot be obtained with a single resin material. Further, alloying may satisfactorily provide advantages of respective resins compared with mixing. Thus, the resins may be alloyed, to thereby more efficiently develop thermal resistance, forming property, and mechanical properties, for example. Further, a peripheral component for audio equipment having excellent moisture resistance, dimensional stability, and lightweight property may be obtained. In the present invention, alloying of the polyphenylene ether-based resin (A) and the polystyrene-based resin (B) requires no use of a compatibilizing agent, and significant strength reduction due to reduction in thermal stability, decomposition, or the like may be prevented. Attaining alloying of specific resins without use of a compatibilizing agent to provide a large internal loss and lightweight property, and excellent mechanical and thermal properties is one of achievements of the present invention. An alloying method may appropriately be selected in accordance with the purpose. Examples thereof include melt-kneading, graft copolymerization, and alloying through solvent cast blending. The alloying preferably involves melt-kneading. Melt-kneading allows efficient alloying without significantly degrading the properties of the resins. Conditions such as kneading temperature and kneading time may appropriately be set in accordance with required forming property and the like.

Any appropriate polyphenylene ether-based resin may be used as the polyphenylene ether-based resin (A). The polyphenylene ether-based resin may be used, to thereby provide a peripheral component for audio equipment having excellent thermal resistance, moisture resistance, and mechanical properties. An example of the polyphenylene ether-based resin is a polymer having a repeating unit represented by the following general formula (1).

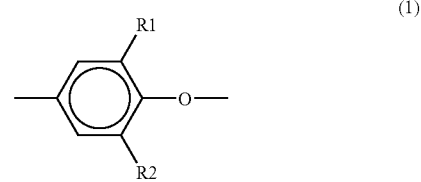

(1)

In the general formula (1), R1 and R2 each independently represent an alkyl group having 1 to 4 carbon atoms, an aryl group having 6 to 8 carbon atoms, a halogen, or hydrogen. Preferably, R1 and R2 each independently represent an alkyl group having 1 to 4 carbon atoms, a halogen, or hydrogen. More preferably, R1 and R2 each independently represent a methyl group, an ethyl group, or hydrogen.

Specific examples of the polyphenylene ether-based resin include: poly(2,6-dimethyl-1,4-phenylene)ether; poly(2-methyl-6-ethyl-1,4-phenylene)ether; poly(2-ethyl-6-n-propyl-1,4-phenylene)ether; poly(2,6-di-n-propyl-1,4-phenylene)

ether; poly(2-methyl-6-n-butyl-1,4-phenylene)ether; and poly(2-ethyl-6-isopropyl-1,4-phenylene)ether. Note that the polyphenylene ether-based resin may be used alone, or may be used in combination.

A molecular weight of the polyphenylene ether-based resin may appropriately be set in accordance with the purpose. For example, the polyphenylene ether-based resin has a number average molecular weight of preferably 5,000 to 1,000,000, more preferably 10,000 to 500,000, and particularly preferably 30,000 to 300,000. A number average molecular weight within the above ranges may provide a peripheral component for audio equipment having desired thermal resistance and mechanical properties.

Any appropriate polystyrene-based resin may be employed as the polystyrene-based resin. The polystyrene-based resin may be included, to thereby provide a peripheral component for audio equipment having excellent forming property, mechanical properties, and thermal resistance. Examples of the polystyrene-based resin include: nucleus alkyl-substituted styrenes such as styrene, α-methylstyrene, α-ethylstyrene, an α-methylstyrene/p-methylstyrene copolymer, o-methylstyrene, m-methylstyrene, and p-methylstyrene; and nucleus halogenated styrenes such as o-chlorostyrene, m-chlorostyrene, p-chlorostyrene, p-bromostyrene, dichlorostyrene, dibromostyrene, trichlorostyrene, and tribromostyrene. The polystyrene-based resin may be used alone, or may be used in combination. Further, the polystyrene-based resin may be subjected to modification treatment as required.

A molecular weight of the polystyrene-based resin may appropriately be set in accordance with the purpose. For example, the polystyrene-based resin has a number average molecular weight of preferably 400 to 500,000, more preferably 5,000 to 100,000, and particularly preferably 10,000 to 30,000. The polystyrene-based resin having a number average molecular weight within the above ranges may provide a peripheral component for audio equipment having excellent forming property, mechanical properties, and thermal resistance.

Any appropriate polyolefin-based resin may be employed as the polyolefin-based resin (C). Addition of the polyolefin-based resin may provide a lightweight peripheral component for audio equipment having excellent forming property. Specific examples of the polyolefin-based resin (C) include homopolymers or copolymers of olefins including: linear α-olefins such as ethylene, propylene, butene-1, pentene-1, hexene-1, heptene-1, and octene-1; branched α-olefins such as 2-methylpropene-1, 3-methylpentene-1, 4-methylpentene-1, 5-methylhexene-1, 4-methylhexene-1, and 4,4-dimethylpentene-1. Preferred examples of the polyolefin-based resin include homopolymers or copolymers containing ethylene, propylene, butene-1, and octene-1,4-methylpentene-1. More preferred examples of the polyolefin-based resin include polyethylene, polypropylene, and an ethylene/propylene copolymer.

A melt flow rate (MFR: index of fluidity) of the polyolefin-based resin may appropriately be set in accordance with the purpose. For example, the melt flow rate (MFR) measured under the conditions of a temperature of 230° C. and a load of 21.2N is preferably 0.01 to 400 g/10 minutes, more preferably 0.15 to 60 g/10 minutes, and particularly preferably 0.3 to 40 g/10 minutes. Further, a molecular weight of the polyolefin-based resin may appropriately be set in accordance with the purpose. For example, polyolefin-based resin has a number average molecular weight of preferably 500 to 100,000, more preferably 1,000 to 50,000, and particularly preferably 5,000 to 30,000. The polyolefin-based resin having a molecular weight within the above ranges may provide a lightweight peripheral component for audio equipment having excellent forming property.

The resin composition may further contain any appropriate additive as required. Specific examples of the additive include a plasticizer, a stabilizer, a UV absorber, an antistatic agent, and a flame retardant. The type and addition amount of the additive may appropriately be selected in accordance with the purpose.

The peripheral component for audio equipment is formed through any appropriate method. An example of the method is described below, but the method is not limited to the method described below. Predetermined amounts of the polyphenylene ether-based resin (A) and the polystyrene-based resin (B) are melt-kneaded under sufficient stirring at a predetermined temperature (230 to 320° C., for example) by using a mixer such as a Henschel mixer or a universal mixer for alloying. A predetermined amount of the polyolefin-based resin (C) is melt-kneaded at 150 to 270° C., for example, into the alloyed resins, to thereby produce pellets. The obtained pellets are formed into a peripheral component for audio equipment through any appropriate method. For example, the obtained pellets may be formed into a peripheral component for audio equipment by using an injection molding machine. For injection molding, an injection (resin) temperature may appropriately be set in accordance with the properties (such as contents and molecular weights) of the resins to be used, and is preferably within a range of 200° C. to 300° C. An injection temperature within the above range may provide the resin composition with excellent fluidity, to thereby facilitate molding. Further, degradation of mechanical properties and the like due to heat degradation of the peripheral component for audio equipment may be prevented. Note that a mold temperature, a resin injection pressure, and the like may appropriately be set in accordance with the properties (such as contents and molecular weights) of the resins to be used.

The peripheral component for audio equipment of the present invention is preferably used for a horn, a field cover, an equalizer, a frame, or an equalizer support. The horn or the like is preferably used for a speaker. FIG. 1 is a schematic sectional view explaining a structure of a speaker in which the peripheral component for audio equipment according to a preferred embodiment of the present invention is used. A speaker 10 is installed in a speaker box through a frame 20. The frame 20 preferably employs the peripheral component for audio equipment of the present invention. The type of the speaker to be used is not limited. An equalizer 30 is fixed at an end part of a diaphragm produced by integrally forming an inner periphery diaphragm and an outer periphery diaphragm, for example. The equalizer 30 preferably employs the peripheral component for audio equipment of the present invention. A field cover 40 also preferably employs the peripheral component for audio equipment of the present invention. Note that the frame 20 and the equalizer 30 may be formed integrally. As described above, the peripheral component for audio equipment of the present invention may be used, to thereby provide a lightweight speaker having a good balance between a large internal loss and excellent mechanical properties, and having excellent thermal resistance and an excellent S/N ratio.

Hereinafter, the present invention will be described more specifically with reference to examples, but the present invention is not limited to the examples.

EXAMPLE 1

An amorphous polyphenylene ether-based resin (A) having a basic structure represented by the following chemical formula (2) and a polystyrene-based resin (B) in a weight ratio of 80/20 were melt-kneaded (kneading temperature of 300° C.) under sufficient stirring by using a Henschel mixer for alloying. Then, 10 parts by weight of a polyolefin-based resin (C) was added to 100 parts by weight of the alloyed polyphenylene ether-based resin (A)/polystyrene-based resin (B) for melt-kneading (kneading temperature of 250° C.), and the resultant was formed into pellets.

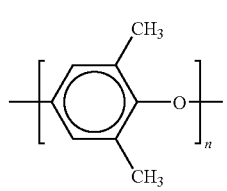

(2)

The obtained pellets were subjected to injection molding by using a mold for a speaker front mounting plate, to thereby form a peripheral component for audio equipment. Molding conditions included: an injection pressure of 50 MPa; an injection (resin) temperature of 280° C.; and a mold temperature of 80 to 120° C. The obtained peripheral component for audio equipment was measured for density, bending strength, deflection temperature under load, and loss factor. Table 1 shows the obtained results. Note that the loss factor was measured by: preparing a strip sample (width of 15 mm, length of 100 mm) under the same conditions as those for formation of the peripheral component for audio equipment; and using a fast Fourier transformation device through a cantilever method by non-contact random vibration while one end of the sample was fixed.

Figure 2:
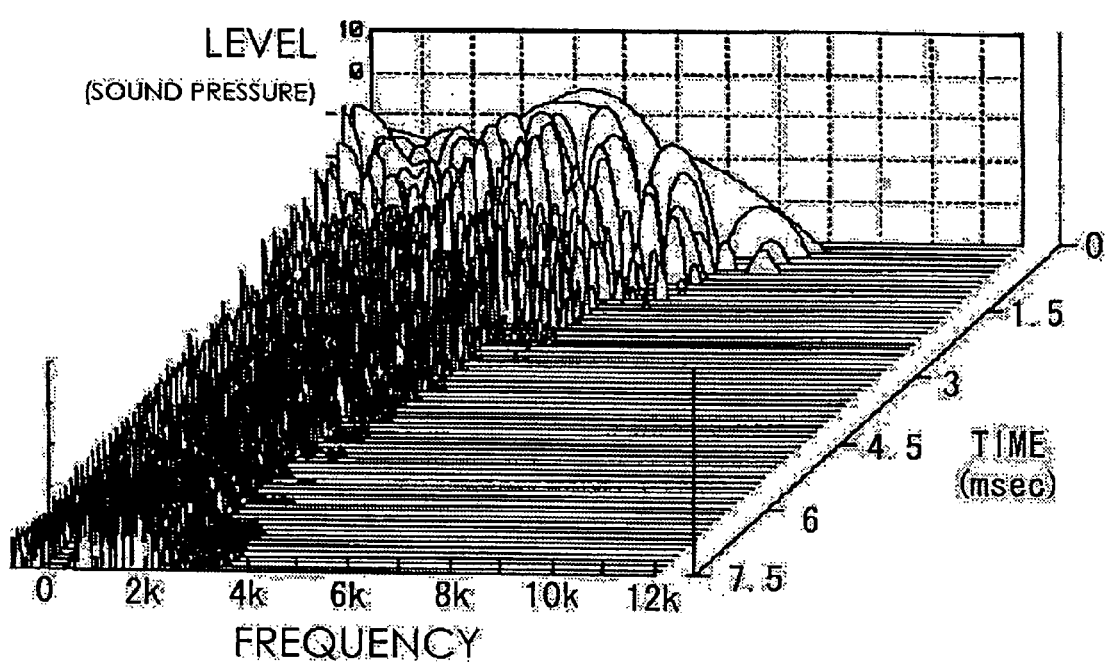
FIG. 2 is a Wigner distribution diagram of a peripheral component for audio equipment used in Example 1 of the present invention.

Further, the obtained peripheral component for audio equipment was vibrated with an impulse hammer, and the vibration was measured through acceleration pick-up and represented in Wigner distribution. FIG. 2 shows the obtained results.

TABLE 1

| | Density (g/cm$^3$) | Bending strength (Mpa) | Deflection temperature under load (° C.) | Loss factor (%) |
|---|---|---|---|---|
| Example 1 | 1.05 | 79 | 140 | 4.4 |
| Example 2 | 1.04 | 76 | 120 | 4.8 |
| Comparative Example 1 | 1.15 | 82 | 145 | 2.6 |
| Comparative Example 2 | 1.23 | 96 | 152 | 0.89 |
| Comparative Example 3 | 1.16 | 61 | 85 | 1.16 |

EXAMPLE 2

Figure 3:
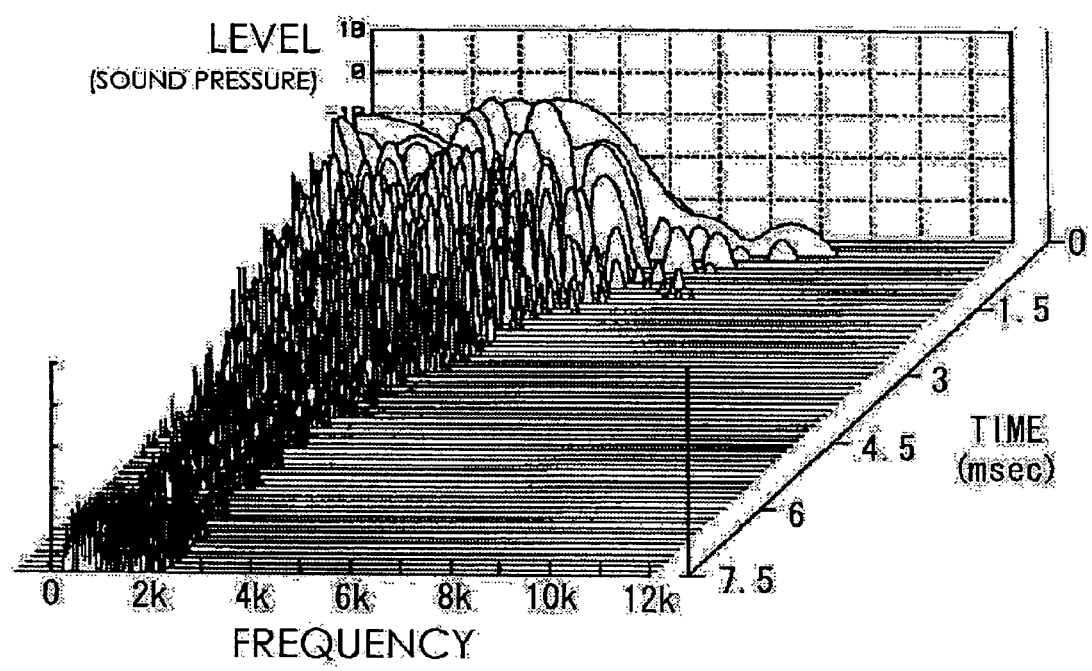
FIG. 3 is a Wigner distribution diagram of a peripheral component for audio equipment used in Example 2 of the present invention.

A peripheral component for audio equipment was formed in the same manner as in Example 1 except that 20 parts by weight of the polyolefin-based resin (C) was included. The obtained peripheral component for audio equipment was subjected to the same measurement as that of Example 1. Table 1 shows the results. Further, Wigner distribution of the obtained peripheral component for audio equipment was measured in the same manner as in Example 1. FIG. 3 shows the obtained results.

COMPARATIVE EXAMPLE 1

Figure 4:
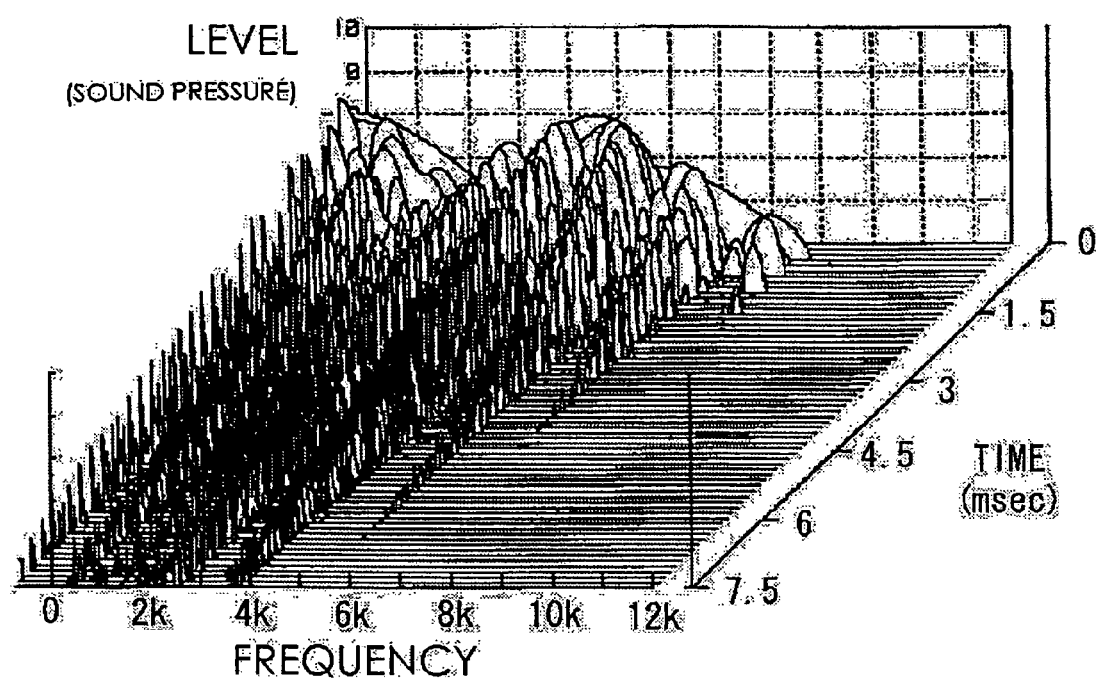
FIG. 4 is a Wigner distribution diagram of a peripheral component for audio equipment used in Comparative Example 1.

A peripheral component for audio equipment was formed in the same manner as in Example 1 except that the polyolefin-based resin (C) was not included. The obtained peripheral component for audio equipment was subjected to the same measurement as that of Example 1. Table 1 shows the results. Further, Wigner distribution of the obtained peripheral component for audio equipment was measured in the same manner as in Example 1. FIG. 4 shows the obtained results.

COMPARATIVE EXAMPLE 2

Figure 5:
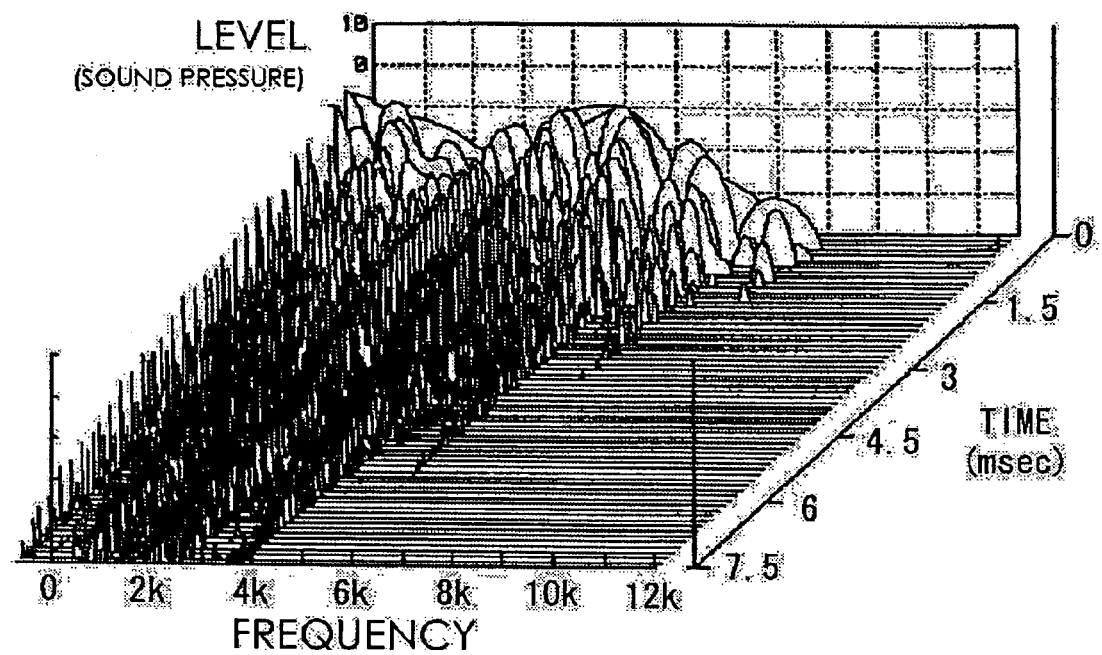
FIG. 5 is a Wigner distribution diagram of a peripheral component for audio equipment used in Comparative Example 2.

A peripheral component for audio equipment was formed in the same manner as in Example 1 except that a mixture containing 50 parts by weight of the polyphenylene ether-based resin (A), 50 parts by weight of a polyamide-based resin and 0.5 part by weight of a compatibilizing agent was used. The obtained peripheral component for audio equipment was subjected to the same measurement as that of Example 1. Table 1 shows the results. Further, Wigner distribution of the obtained peripheral component for audio equipment was measured in the same manner as in Example 1. FIG. 5 shows the obtained results.

COMPARATIVE EXAMPLE 3

Figure 6:
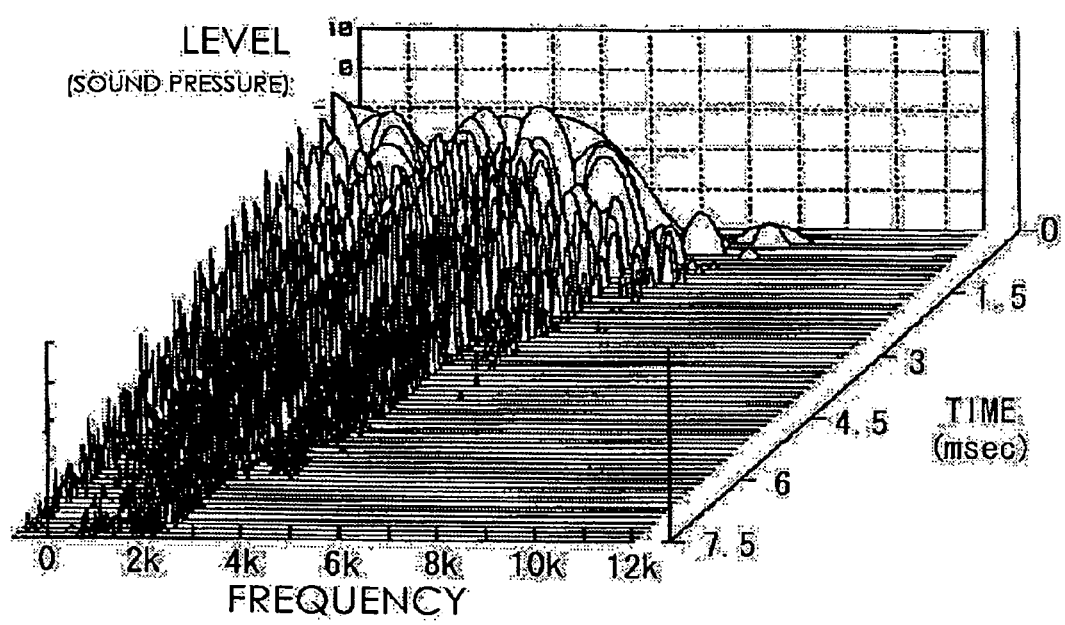
FIG. 6 is a Wigner distribution diagram of a peripheral component for audio equipment used in Comparative Example 3.

A peripheral component for audio equipment was formed using 100 parts by weight of an ABS resin in the same manner as in Example 1. The obtained peripheral component for audio equipment was subjected to the same measurement as that of Example 1. Table 1 shows the results. Further, Wigner distribution of the obtained peripheral component for audio equipment was measured in the same manner as in Example 1. FIG. 6 shows the obtained results.

[Evaluation]

Table 1 reveals that the peripheral component for audio equipment of each of Examples 1 and 2 has low density (by about 10 to 15%) compared with that of each of Comparative Examples 1 and 2, and thus is lightweight and has a very large loss factor (internal loss). Further, Table 1 reveals that the peripheral component for audio equipment of each of Examples 1 and 2 is lightweight, has excellent strength and thermal resistance, and has a large loss factor compared with that of Comparative Example 3. The results indicate that a lightweight peripheral component for audio equipment having a good balance between a large internal loss and excellent mechanical properties, and having excellent thermal resistance can be obtained by including the polyphenylene ether-based resin, the polystyrene-based resin, and the polyolefin-based resin.

FIGS. 2 to 6 reveal that the peripheral component for audio equipment of each of Examples 1 and 2 has no delayed attenuation in frequency bands in vicinities of 4 kHz, 6 kHZ, and 8 kHz. Further, vibration at a high frequency level is liable to be attenuated, indicating that generation of unnecessary noise inherent in material from the peripheral component for audio equipment (a front plate part or an equalizer part, for example) of the present invention can be suppressed. As a result, a peripheral component for audio equipment having a large internal loss and an excellent S/N ratio can be obtained. Therefore, the present invention can provide a lightweight peripheral component for audio equipment having a good balance between a large internal loss and excellent mechanical properties, and having excellent thermal resistance and an excellent S/N ratio.

The peripheral component for audio equipment of the present invention can be used for a horn, a field cover, an equalizer, a frame, or an equalizer support. The horn or the like may suitably be used for a speaker.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A peripheral component for audio equipment comprising: a polyphenylene ether-based resin (A); a polystyrene-based resin (B); and a polyolefin-based resin (C), wherein the polyolefin-based resin comprises at least one selected from the group consisting of polyethylene, polypropylene, and an ethylene/propylene copolymer, and wherein the peripheral component is used for at least one member selected from the group consisting of a horn, a field cover, an equalizer, an equalizer support, and a speaker front mounting plate.

2. A peripheral component for audio equipment according to claim 1, wherein a weight ratio of the polyphenylene ether-based resin (A) to the polystyrene-based resin (B) (A)/(B) is 90/10 to 70/30.

3. A peripheral component for audio equipment according to claim 1 wherein the polyolefin-based resin (C) is included in an amount of 5 to 20 parts by weight with respect to 100 parts by weight in total of the polyphenylene ether-based resin (A) and the polystyrene-based resin (B).

4. A peripheral component for audio equipment according to claim 1 wherein the polyphenylene ether-based resin (A) and the polystyrene-based resin (B) are alloyed.

5. A peripheral component for audio equipment according to claim 1 wherein the polyphenylene ether-based resin has a number average molecular weight of 5,000 to 1,000,000.

6. A peripheral component for audio equipment according to claim 1 wherein the polystyrene-based resin has a number average molecular weight of 400 to 500,000.

7. A peripheral component for audio equipment according to claim 1, wherein the polyolefin-based resin has a number average molecular weight of 500 to 100,000.

8. A speaker comprising the peripheral component for audio equipment according to claim 1.

* * * * *